(12) United States Patent
Wilson et al.

(10) Patent No.: US 10,697,290 B2
(45) Date of Patent: Jun. 30, 2020

(54) DISTRIBUTED MAGNETOMOTIVE FORCE SENSIN

(71) Applicant: Halliburton Energy Services, Inc., Houston, TX (US)

(72) Inventors: Glenn Andrew Wilson, Houston, TX (US); Tasneem A. Mandviwala, Katy, TX (US); Ahmed Fouda, Houston, TX (US); Burkay Donderici, Houston, TX (US); Etienne M. Samson, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 171 days.

(21) Appl. No.: 15/745,605

(22) PCT Filed: Sep. 28, 2015

(86) PCT No.: PCT/US2015/052696
§ 371 (c)(1),
(2) Date: Jan. 17, 2018

(87) PCT Pub. No.: WO2017/058144
PCT Pub. Date: Apr. 6, 2017

(65) Prior Publication Data
US 2018/0223648 A1    Aug. 9, 2018

(51) Int. Cl.
*E21B 47/10*    (2012.01)
*G01V 3/30*     (2006.01)

(52) U.S. Cl.
CPC ............... *E21B 47/10* (2013.01); *G01V 3/30* (2013.01)

(58) Field of Classification Search
CPC ............................. E21B 47/10; E21B 47/123
See application file for complete search history.

(56) References Cited

U.S. PATENT DOCUMENTS 7,049,622 B1    5/2006  Weiss
2006/0272809 A1  12/2006  Tubel et al.
(Continued)

FOREIGN PATENT DOCUMENTS

WO    2014105069 A1    7/2014
WO    2017058144 A1    4/2017

*Primary Examiner* — Caroline N Butcher
(74) *Attorney, Agent, or Firm* — Thomas Rooney; Parker Justiss, P.C.

(57) ABSTRACT

A formation monitoring system includes a casing that defines an annular space within a borehole. A distributed magnetomotive force sensor is positioned in the annular space and configured to communicate with the surface via a fiber-optic cable. A computer coupled to the fiber-optic cable receives measurements and responsively derives the location of any fluid fronts in the vicinity such as an approaching flood front to enable corrective action before breakthrough. A formation monitoring method includes: injecting a first fluid into a reservoir formation; producing a second fluid from the reservoir formation via a casing in a borehole; collecting magnetic field measurements with a distributed magnetomotive force sensor in an annular space between the casing and the borehole, communicating measurements to a surface interface via one or more fiber-optic cables; and operating on the measurements to locate a front between the first and second fluids.

19 Claims, 11 Drawing Sheets

(56) References Cited

U.S. PATENT DOCUMENTS

2014/0175271 A1* 6/2014 Samson ............... E21B 47/123
 250/264
2014/0191120 A1* 7/2014 Donderici ............. E21B 47/123
 250/265

* cited by examiner

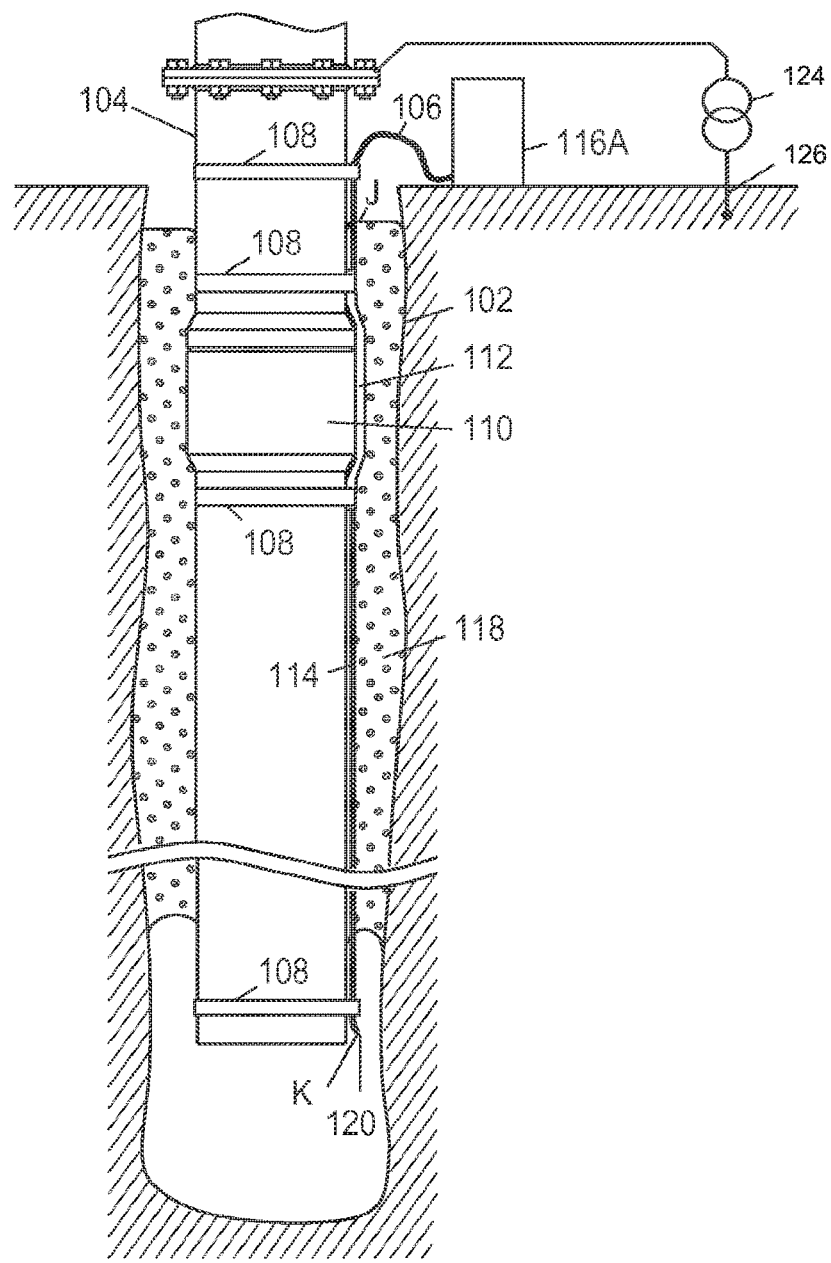

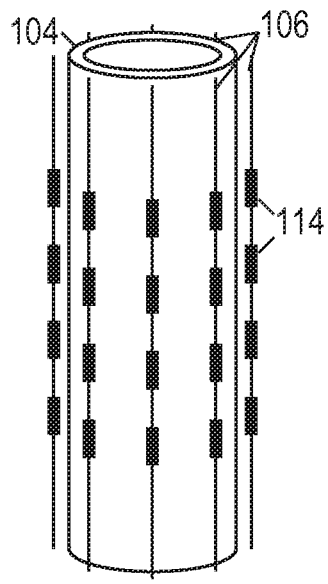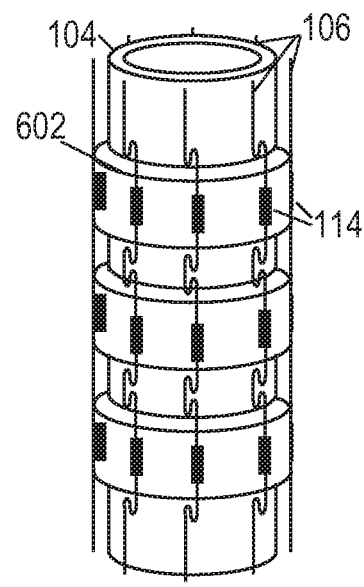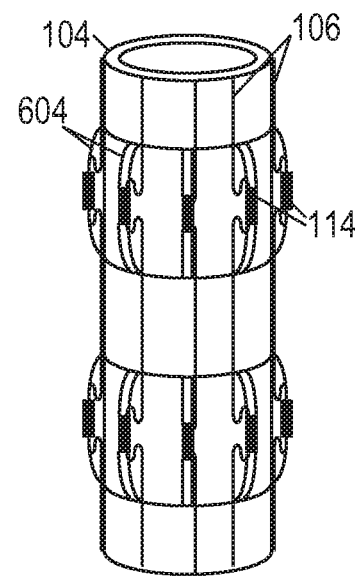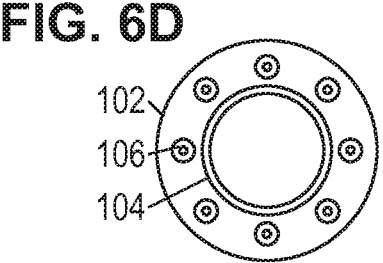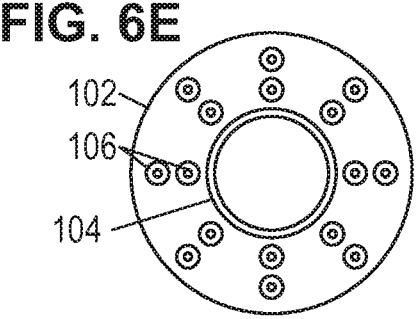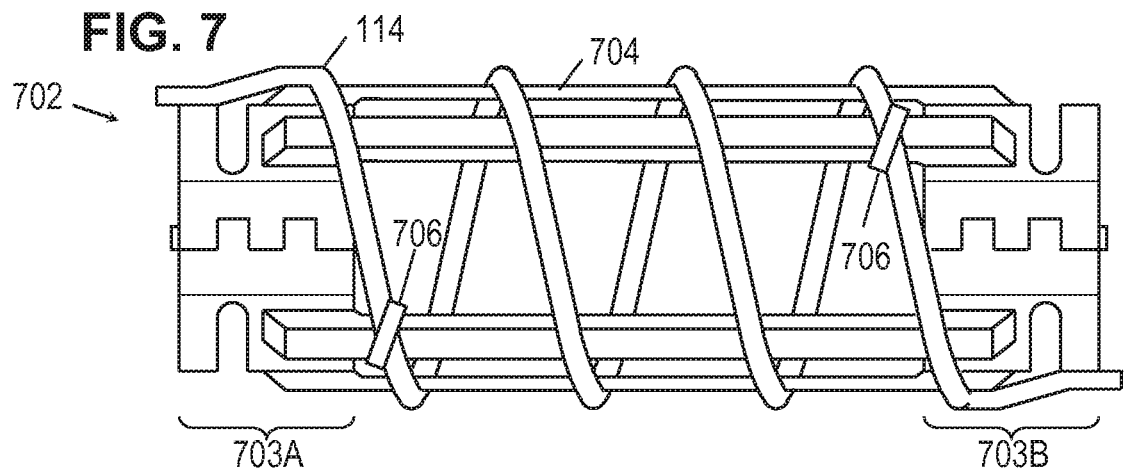

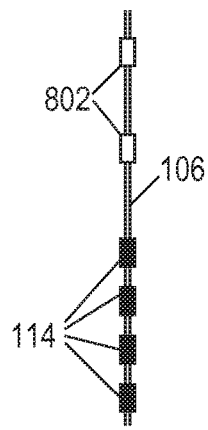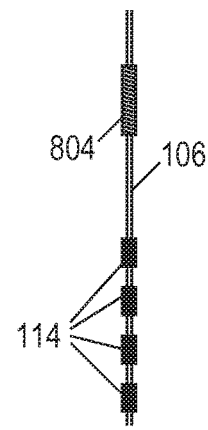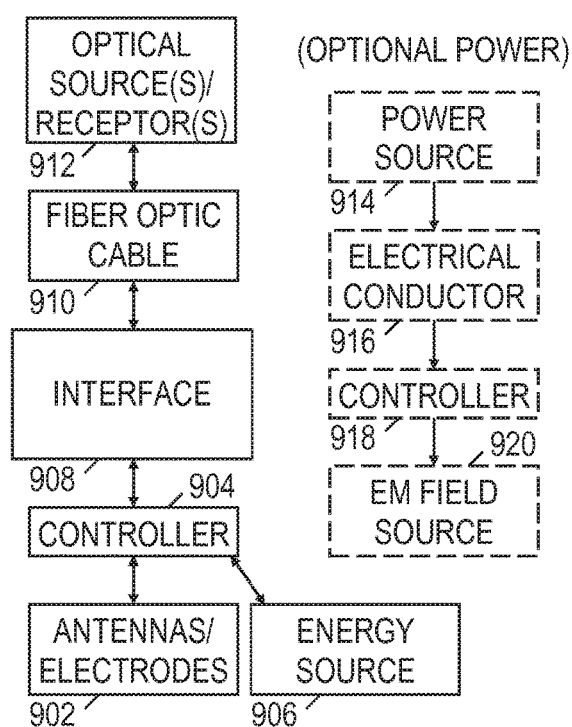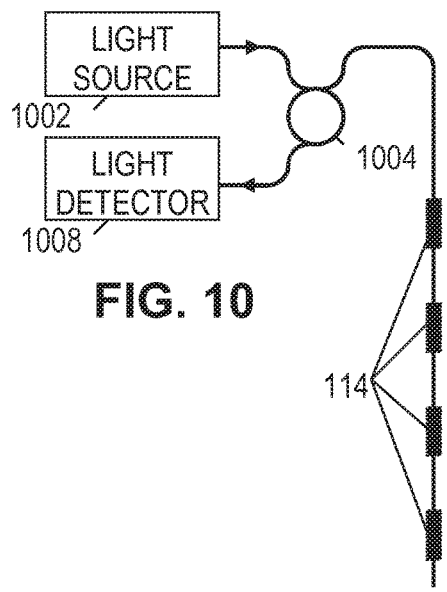

DISTRIBUTED MAGNETOMOTIVE FORCE SENSIN

CROSS-REFERENCE TO RELATED APPLICATION

This application is the National Stage of, and therefore claims the benefit of, International Application No. PCT/US2015/052696 filed on Sep. 28, 2015, entitled "DISTRIBUTED MAGNETOMOTIVE FORCE SENSING," which was published in English under International Publication Number WO 2017/058144 on Apr. 6, 2017. The above application is commonly assigned with this National Stage application and is incorporated herein by reference in its entirety.

BACKGROUND

Oil field operators drill boreholes into subsurface reservoirs to recover oil and other hydrocarbons. If the reservoir has been partially drained or if the oil is particularly viscous, the oil field operators will often stimulate the reservoir, e.g., by injecting water or other fluids into the reservoir via secondary wells to encourage the oil to move to the primary ("production") wells and thence to the surface. Other stimulation treatments include fracturing (creating fractures in the subsurface formation to promote fluid flow) and acidizing (enlarging pores in the formation to promote fluid flow).

This flooding process can be tailored with varying fluid mixtures, flow rates/pressures, and injection sites, but may nevertheless be difficult to control due to inhomogeneity in the structure of the subsurface formations. The fluid interface between the reservoir fluid and the injected fluid, often termed the "flood front", develops protrusions and irregularities that may reach the production well before the bulk of the residual oil has been flushed from the reservoir. This "breakthrough" of the flood fluid is undesirable, as it typically necessitates increased fluid handling due to the injected fluid's dilution of the oil and may further reduce the drive pressure on the oil. Continued operation of the well often becomes commercially infeasible.

The stimulation processes can be tailored with varying fluid mixtures, flow rates/pressures, and injection sites, but may nevertheless be difficult to control due to inhomogeneity in the structure of the subsurface formations. The production process for the desired hydrocarbons also has various parameters that can be tailored to maximize well profitability or some other measure of efficiency. Without sufficiently detailed information regarding the effects of stimulation processes on a given reservoir and the availability and source of fluid flows for particular production zones, the operator is sure to miss many opportunities for increased hydrocarbon recovery.

BRIEF DESCRIPTION OF THE DRAWINGS

Accordingly, there are disclosed herein various distributed magnetomotive force (MMF) sensing methods and systems for formation monitoring. In the drawings:

FIGS. 1A-1B show two illustrative environments for permanent monitoring.

FIGS. 6A-6E show various illustrative sensing array configurations.

FIG. 7 shows yet another illustrative sensing array configuration.

FIGS. 8A-8B show illustrative combined source-sensor cable configurations.

FIG. 9 is a function block diagram of an illustrative formation monitoring system.

FIG. 10 shows an illustrative multiplexing architecture for distributed MMF sensing using a fiber termination point.

Figure 1B:
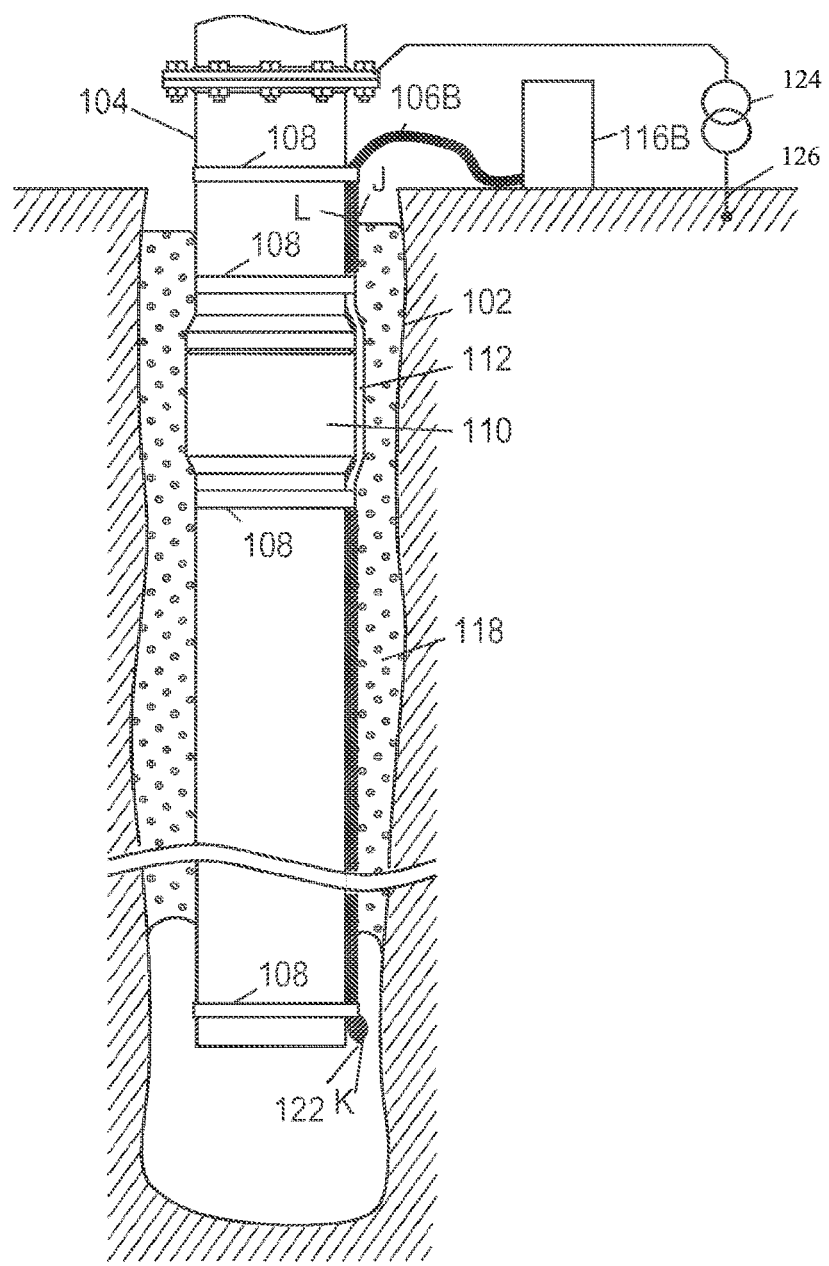

It should be understood, however, that the specific embodiments given in the drawings and detailed description below do not limit the disclosure. On the contrary, they provide the foundation for one of ordinary skill to discern the alternative forms, equivalents, and other modifications that are encompassed in the scope of the appended claims.

DETAILED DESCRIPTION

The following disclosure presents a fiber-optic-based technology suitable for use in permanent downhole monitoring environment to track an approaching fluid front and enable actions to optimize hydrocarbon recovery from a reservoir. One illustrative formation monitoring system has a distributed MMF sensor positioned in an annular space around a well casing, the sensor coupled to a surface interface via a fiber-optic cable. The distributed MMF sensor produces signals that are a function of external magnetic fields. The sensor measurements in response to an injected current or another electromagnetic field source can be used to determine a resistivity distribution around the well, which in turn enables tracking of the flood front. (Although the term "flood front" is generally used herein to refer to the fluid interface between reservoir fluid and injected fluid zones, the teachings of the present disclosure apply to the fluid interface between any two fluids having different physical properties that can be distinguished using sensor data.)

Turning now to the drawings, FIGS. 1A and 1B show illustrative permanent downhole monitoring systems in a well environment. In both FIG. 1A and FIG. 1B, a borehole 102 contains a casing string 104 with a fiber-optic cable 106 secured to it by bands 108. Casing 104 is a tubular pipe, usually made of steel, that preserves the integrity of the borehole wall and borehole. Where the cable 106 passes over a casing joint 110, it may be protected from damage by a cable protector 112. Magnetomotive force (MMF) field sensors 114 are integrated into the cable 106 or on the surface of the cable 106 to obtain magnetic field measurements and communicate those measurements to a surface interface 116 via fiber-optic cable 106.

The remaining annular space may be filled with cement 118 to secure the casing 104 in place and prevent fluid flows in the annular space. Fluid enters the uncemented portion of the well (or alternatively, fluid may enter through perforated portions of the well casing) and reaches the surface through the interior of the casing. Note that this well configuration is merely illustrative and not limiting on the scope of the disclosure. Many production wells are provided with multiple production zones that can be individually controlled. Similarly, many injection wells are provided with multiple injection zones that can be individually controlled.

In FIG. 1A, the fiber-optic cable 106 extends from the surface interface 116A to a mirror 120. The distributed MMF sensor 114 portion of the fiber-optic cable 106 extends from J to K.

In FIG. 1B, the fiber-optic cable 106 extends from the surface interface 116B to a return 122 at a lower part of the borehole 102 and back to the surface to the surface interface 116B. The distributed MMF sensor 114 portion of the fiber-optic cable 106 extends from J to K. The portion of the fiber-optic cable 106 without the distributed MMF sensor 114 extends from K to L. The cable length from J to K is substantially the same as the cable length from K to L. These equivalent cable lengths allows for cancellation of non-magnetic field interferences in the surface interface 116B. For the purposes of this disclosure, substantially the same cable length from K to L may be any of: exactly the same length from J to K, within 1% of the length from J to K, within 5% of the length from J to K, within 10% of the length from J to K, or within some percent of the length from J to K such that the induced error is no more 1×, 2×, or 3× of the total induced error from other known sources in calculations using the distributed MMF sensor response.

Surface interface 116 (A and B) includes an optical port for coupling the optical fiber(s) in cable 106 to a light source and a detector. The light source transmits pulses of light along the fiber optic cable, including along all parts of distributed MMF sensor 114. The sensor 114 modifies the light pulses to provide measurements of magnetic field strength, magnetic field gradient, or time derivative of the magnetic fields, based on the interaction techniques used. The modifications may affect amplitude, phase, or frequency content of the light pulses. Some systems may employ multiple fibers, in which case an additional light source and detector can be employed for each fiber, or the existing source and detector may be switched periodically between the fibers. Some system embodiments may alternatively employ continuous wave (CW) light rather than light pulses.

FIGS. 1A and 1B further show a power source 124 coupled between the casing 104 and a remote earth electrode 126. Because the casing 104 is an electrically conductive material (e.g., steel), it acts as a source electrode for current flow into the formations surrounding the borehole 102. The magnitude and distribution of the current flow will vary in accordance with the source voltage and the formation's resistivity profile. The magnetic field measurements by sensors 114 will thus be representative of the resistivity profile. This resistivity profile in turn is indicative of the fluids in the formation pores, enabling the flood front to be located and tracked over time.

The surface interface 116 (A and B) may be coupled to a computer that acts as a data acquisition system and possibly as a data processing system that analyzes the measurements to derive subsurface parameters and track the location of a fluid front. In some contemplated system embodiments, the computer may further control production parameters to reduce risk of break-through or to otherwise optimize production based on the information derived from the measurements. Production parameters may include the flow rate/pressure permitted from selected production zones, flow rate/pressure in selected injection zones, and the composition of the injection fluid, each of which can be controlled via computer controlled valves and pumps.

Generally, any such computer would be equipped with a user interface that enables a user to interact with the software via input devices such as keyboards, pointer devices, and touchscreens, and via output devices such as printers, monitors, and touchscreens. The software can reside in computer memory and on nontransient information storage media. The computer may be implemented in different forms including, e.g., an embedded computer permanently installed as part of the surface interface 116 (A and B), a portable computer that is plugged into the surface interface 116 (A and B) as desired to collect data, a remote desktop computer coupled to the surface interface 116 (A and B) via a wireless link and/or a wired computer network, a mobile phone/PDA, or indeed any electronic device having a programmable processor and an interface for I/O. In some embodiments, the casing 104 may be an insulated (e.g., fiber glass) casing, such as for an offshore deployment.

Figure 2:
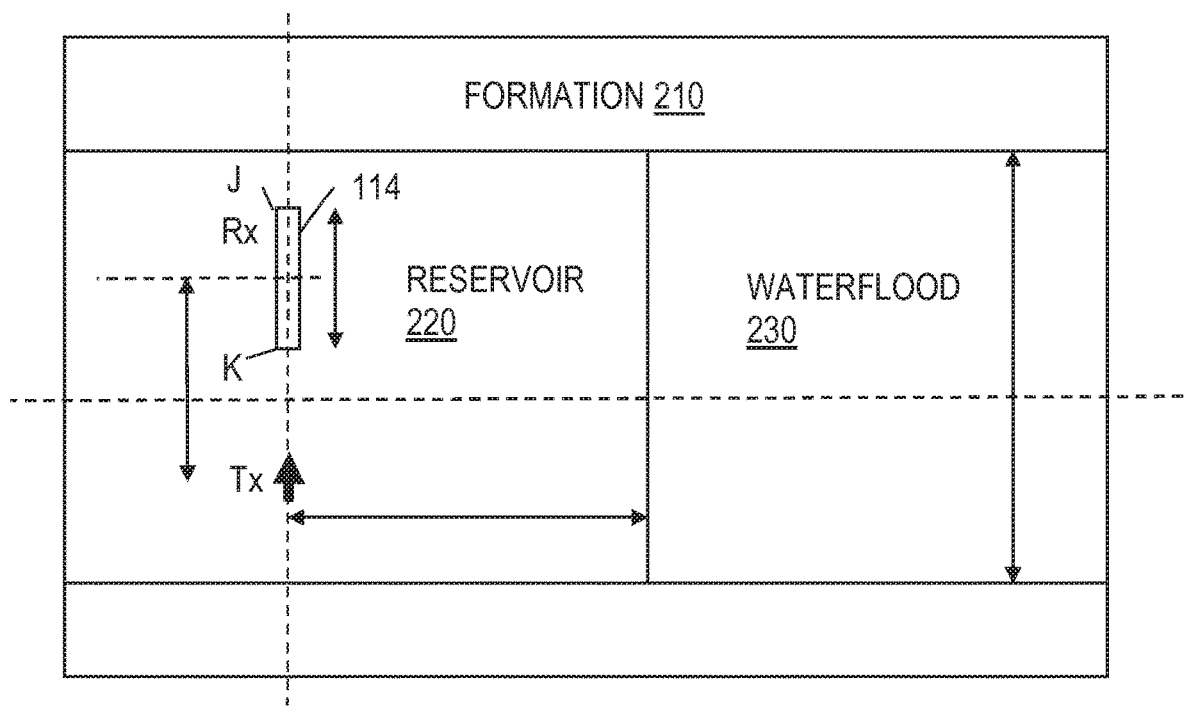
FIG. 2 shows an illustrative reservoir monitoring system in an earth model of a flooded reservoir.

FIG. 2 is a block diagram of an illustrative reservoir monitoring system in an earth model of a flooded reservoir. The earth model is of a formation 210 at top and bottom of the model. The formation 210 may be shale with a resistivity of 5 ohm-meters. The oil-bearing reservoir 220 is on the left side of the model. The reservoir may have a resistivity of 80 ohm-meters. Shown inside the reservoir 220 are a transmitter (Tx) and a receiver 114 (Rx), shown a distance from the waterflood, which marks the residual oil reservoir section. The distance may be 10 feet (3.048 m). The receiver 114 has a predetermined length, and may be 10 feet long (3.048 m). The receiver 114 is the distributed MMF sensor 114 shown and described in detail herein, having a length from J to K. The waterflood 230 is shown on the right side of the model. The waterflood 230 may have a resistivity of 20 ohm-meters. The waterflood 230 (and the reservoir 220) may have a width of 40 feet (12.192 m). The transmitter shown is a vertical magnetic dipole. For modeling purposes, the transmitter is a unit magnetic dipole. Also for modeling purposes, the distance from the transmitter and the receiver 114 to the waterflood is 10 feet (3.048 m).

It is noted that the magnetic dipole transmitter may be made with a multi-turn induction core with a soft magnetic core. The magnetic dipole moment can be increased by more than 1,000 by optimizing the design. The magnetic dipole moment can be further increased by increasing the current used to generate the induced magnetic field, which is plausible for onshore well installations.

Figure 3A:
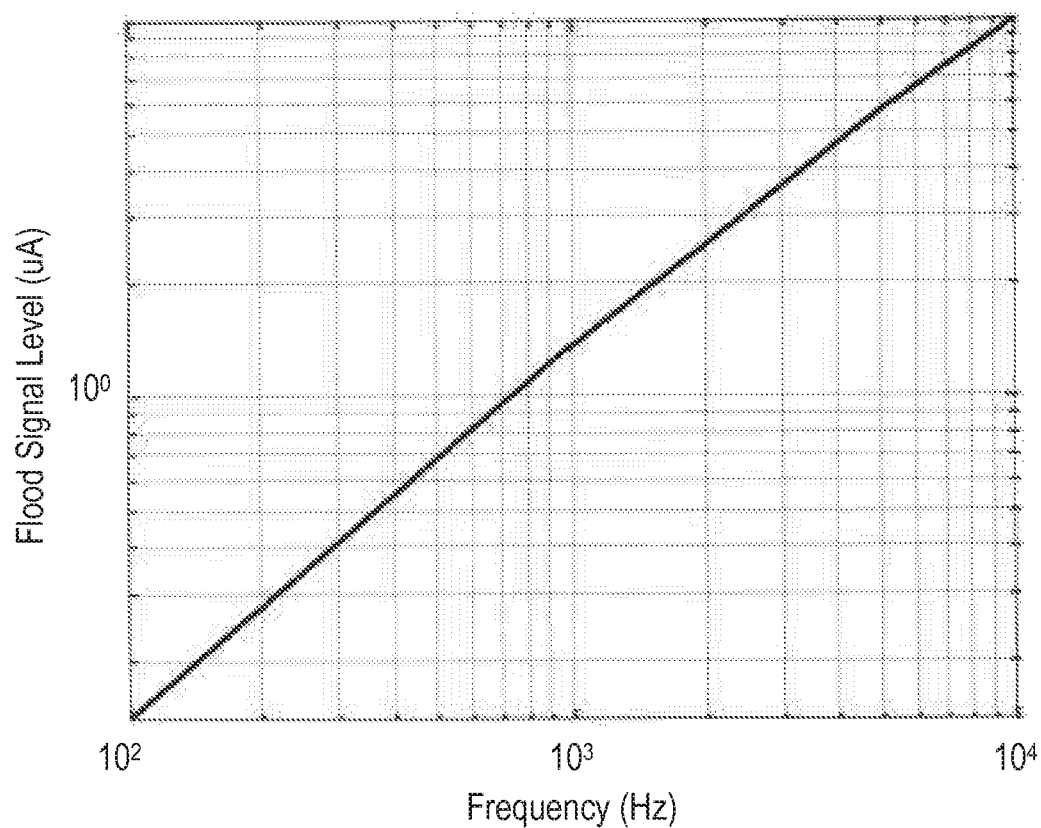
FIGS. 3A-3B show modeled signal level and signal sensitivity for the model shown in FIG. 2.
Figure 3B:
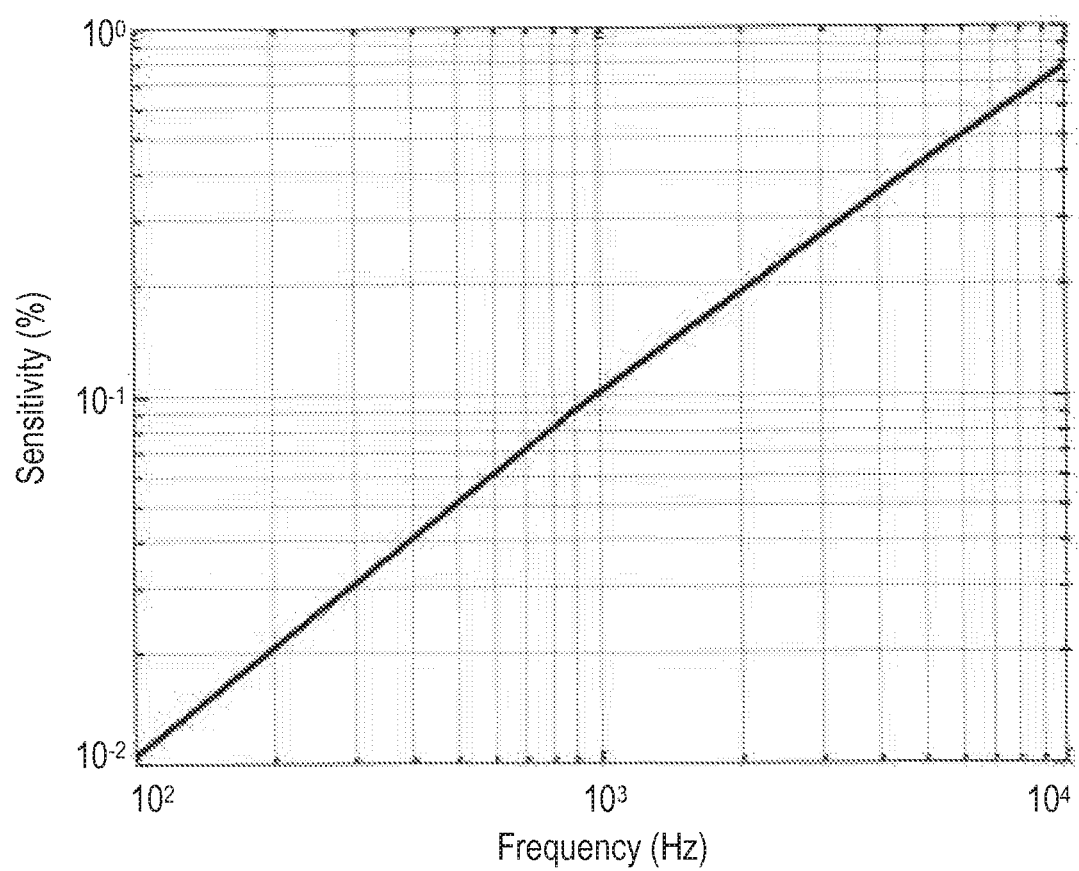

FIGS. 3A-3B show modeled signal level and signal sensitivity for the earth model shown in FIG. 2. In FIG. 3A, modeled flood signal level (microamperes) is shown as a function of frequency (Hz) on a log-log graph for a 10-foot long MMF sensor with a nickel jacket of 50 μm. The results are quasi-linear (slight curvature upwards in the center) on the graph from 100 Hz to 10 kHz, with the signal level increasing from just below 0.1 to about 10. The minimum detectable magnetic field for this configuration is about 5 mA. If the nickel coating is annealed, the minimum detectable magnetic field is expect to be about 50 μA.

In FIG. 3B, modeled sensitivity (%) is shown as a function of frequency (Hz) on a log-log graph for a 10-foot long MMF sensor. The results are quasi-linear (very slight bulge upwards in the center) on the graph from 100 Hz to 10 kHz, with the sensitivity increasing from about 0.01% to about 0.8%.

Figure 4A:
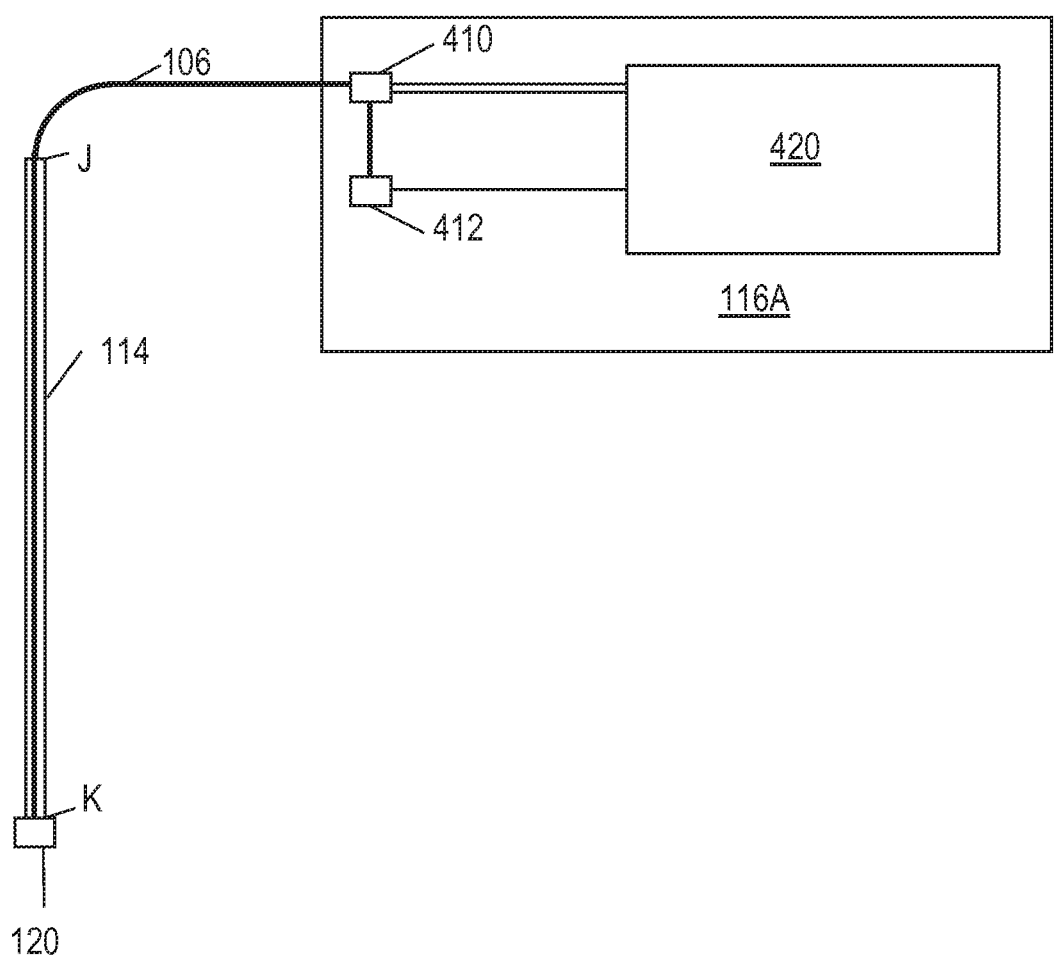
FIGS. 4A-4B show illustrative block diagrams of the monitoring systems of FIGS. 1A-1B, respectively.
Figure 4B:
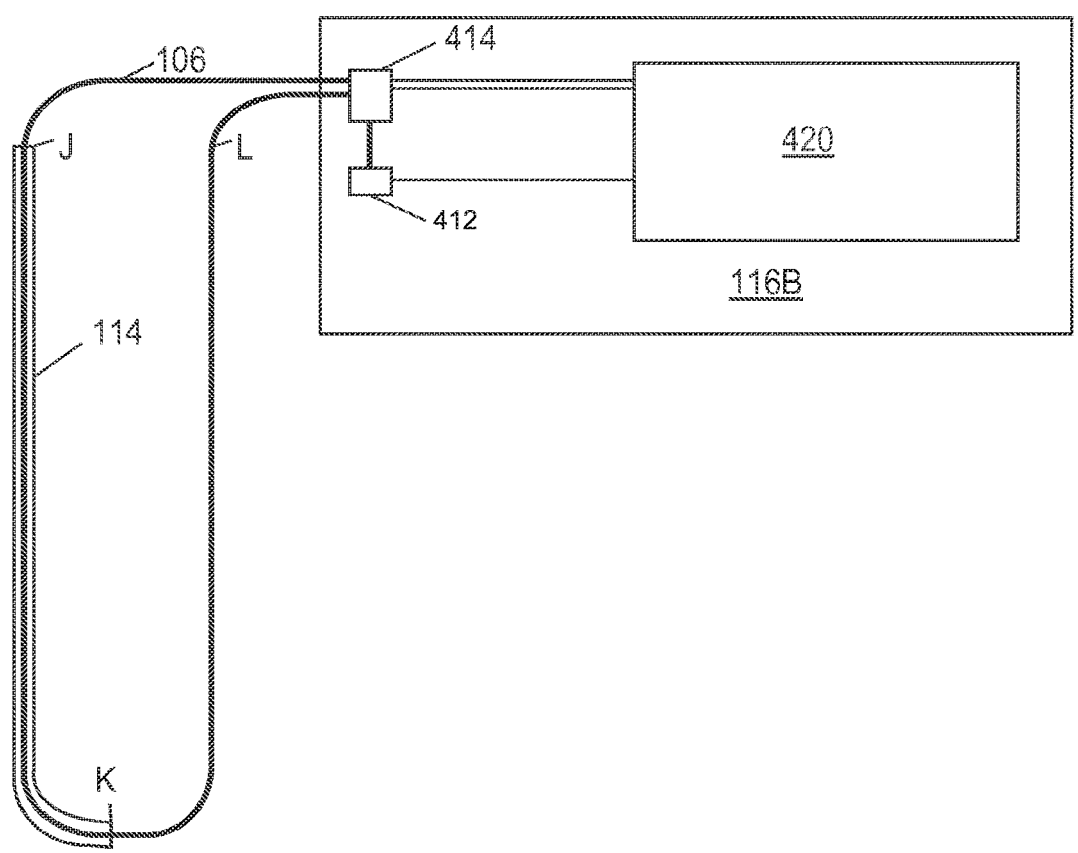

FIGS. 4A-4B show illustrative block diagrams of the monitoring systems of FIGS. 1A-1B, respectively. In FIG. 4A, extending from the surface interface 116A is the fiber-optic cable 106. A portion of the fiber-optic cable 106, starting at J and extending to K, includes the distributed MMF sensor 114. At the end of the fiber-optic cable 106 at K is an optical reflector 120, such as a mirror 120, to reflect optical signals in the fiber-optic cable 106 back towards the surface interface 116A.

As shown, included in the surface interface 116A are an optical interface 410 that includes an optical receiver that provides electrical signals representative of received optical signals to a data acquisition system 420. A light source 412 provides a transmitted light input signal to the fiber-optic cable 106. Preferably, the optical interface 410 samples the transmitted light input signal provided to the fiber-optic cable 106 so the surface interface 116A may receive a baseline signal for calibration purposes. In the embodiment of FIG. 4A, the data acquisition system 420 may comprise an optical interrogation system 420 configured to receive the electrical signals representative of the received optical signals and derive parameters representative of the modification of the light input signal by the MMF sensor 114. The data acquisition system 420 may include a computer. The data acquisition system 420 may alternatively store data and provide the data for analysis via a port, a wired interface, or a wireless interface, using communication protocols known in the art.

In FIG. 4B, extending from the surface interface 116B is the fiber-optic cable 106. A portion of the fiber-optic cable 106, starting at J and extending to K, includes the distributed MMF sensor 114. The fiber-optic cable 106 has a bend 122 near K, as the fiber-optic cable 106 returns to the surface interface 116B. There is sufficient length of fiber-optic cable 106 for an equivalent length of cable to L, such that the length of J to K is substantially the same as the length from K to L. External actors on the fiber-optic cable 106 act equally on the length from J to K as from K to L, allowing for the surface interface 116B to distinguish between the responses of the fiber-optic cable 106 and the response from the MMF sensor 114.

As shown, included in the surface interface 116B are an optical interface 410 including an optical receiver that provides electrical signals representative of received optical signals to a data acquisition system 420. The optical interface 410 may provide the same light signal down the fiber-optic cable 106 towards J and L, or the optical interface 410 may provide one light signal towards J and a different light signal towards L. Thus, the light traveling along the fiber-optic cable 106 may have the same signal starting in opposite directions around the fiber-optic cable 106 loop, or different light signals starting in opposite directions around the fiber-optic cable 106 loop. A light source 412 provides a transmitted light input signal to the fiber-optic cable 106. Preferably, the optical receiver 410 samples the transmitted light input signal provided to the fiber-optic cable 106 so the surface interface 116B may receive a baseline signal for calibration purposes.

In the embodiment of FIG. 4B, the data acquisition system 420 may comprise a Sagnac interferometer 420 configured to receive the electrical signals representative of the received optical signals and derive parameters representative of the modification of the light input signal by the MMF sensor 114. The data acquisition system 420 may include a computer. The data acquisition system 420 may alternatively store data and provide the data for analysis via a port, a wired interface, or a wireless interface, using communication protocols known in the art.

The magnetomotive force (u), measured in amperes, is defined as the line integral of the magnetic field H along a path l:

$$u = \int H dl$$

where the vectors H and l are collinear. The convention for a "line integral" quantity such as the magnetomotive force is a positive reference at the start of the path integration.

A magnetomotive force sensor 114 may be a magneto-optical transducer formed by coating (or jacketing) a section of the fiber-optic cable 106 with a magnetostrictive material. Contemplated magnetostrictive materials include Terfernol-D, Metglass, nickel, or a nickel alloy. In preferred embodiments of the magnetomotive force sensor 114, the magnetostrictive material is nickel or a nickel alloy due to a higher magnetostriction sensitivity for low intensity magnetic fields. In other embodiments, the coating may be the magnetostrictive material dispersed in a polymer matrix around the fiber-optic cable core.

As the magnetomotive force sensor 114 is exposed to a time-varying magnetic field with a component in the direction of the axis of the fiber-optic cable 106, the magnetostrictive material elongates or contracts. The mechanical coupling of the magnetostrictive material to the fiber-optic core ensures that the deformation of the magnetostrictive material is transferred as a strain to the fiber-optic cable 106. Over the interval −z to +z along the magnetomotive force sensor 114, the strain ε on the fiber-optic cable 106 is proportional to the magnetomotive force:

$$\varepsilon \propto \int_{-z}^{+z} H dl$$

Generally, the system will be operated such that the strain ε is linearly proportional to the magnetomotive force:

$$\varepsilon = k \int_{-z}^{+z} H dl$$

For distributed sensing of the magnetomotive force, at most half of the length of the fiber-optic cable 106 is used for the distributed MMF sensor 114. In a preferred embodiment, the fiber-optic cable 106 is deployed to form an optical loop, whereby path JK is the distributed MMF sensor 114 and path KL is uncoated fiber-optic cable 106. In one embodiment, the optical loop is interrogated for distributed strain measurements using methods of Sagnac interferometry. Examples of these methods may be found elsewhere as used with other electromagnetic sensing techniques.

The use of distributed MMF sensors 114 has an advantage over the use of discrete magnetic field sensors in that discrete magnetic field sensors must be bonded to the fiber-optic cable 106. Thus system fabrication and deployment in a permanent reservoir monitoring system is simplified. The distributed MMF sensor 114 has a lower sensitivity to the magnetic field when compared to discrete magnetic field sensors for very small magnetic fields, such as found in offshore well configurations where electrical power is limited. This disadvantage is offset with a lower cost of deployment for applications where the magnetic fields are larger, such as with onshore wells with ample electrical power available.

The distributed MMF sensor 114 may be permanently or temporarily installed on a surface (e.g., a seafloor) or in a single well or in multiple wells. The distributed MMF sensor 114 may be operated with one or more electric or magnetic EM sources, which may be deployed on a surface (e.g., a seafloor) or in a single well or in multiple wells.

Since formations of interest (e.g., oil or gas producing zones) are known before installation, the entire length JK does not need to be used for the distributed MMF sensor 114, only the sections of interest need to be used for the distributed MMF sensor 114. The fiber-optic cable 106 may include sections of uncoated fiber-optic cable 106 intermixed with one or more sections of the distributed MMF sensor 114.

The homogeneity of the bonding between the magnetostrictive jacket and the fiber-optic core of the distributed MMF sensor 114 is important for ensuring magnetostriction is transferred to fiber strain ε. Any temperature differential and gravity strain between the uncoated fiber-optic cable 106 and the distributed MMF sensor 114 may lead to non-uniform stresses, fractures, or even breaks. To limit such potential damage, some embodiments have partial or full cuts on the magnetostrictive material to release tension during deployment. This will be especially relevant for gravity-induced strain in free-hanging wireline-deployed sensor systems.

In other embodiments, the fiber-optic cable 106 is periodically coated with a material that does not bond with the magnetostrictive material. For example, every three units of fiber-optic cable 106 may include two units length of the magnetostrictive material for the distributed MMF sensor 114 and one unit of the non-bonding material.

The disclosed distributed MMF sensor 114 has sensitivity along the direction of the fiber-optic cable 106. If deployed as a cable run downhole, then the sensor system has sensitivity along the borehole 102 axis. In some embodiments, azimuthal sensitivity may be obtained by spiraling the distributed MMF sensor 114 about the casing 104 or the tool body. See FIG. 7 below.

In some embodiments, the disclosed distributed MMF sensor 114 may be simultaneously deployed with other fiber-optic based sensor systems, including but not limited to acoustic, temperature, and/or strain sensing. In some embodiments, the one or more distributed fiber-optic-based sensing systems are deployed from the same tubing encapsulated cable (TEC) to provide operational stability in high pressure (e.g., up to 35,000 psi) and/or high temperature (e.g., over 260° C.) environments, which also subject to chemical interactions and continuous vibrations for extended periods, as are typically encountered in oilfield wells. The optical fibers of the fiber-optic cables 106, whether TEC or not, may be multi-modal such that more than one distributed sensing method may be simultaneously interrogated.

In some embodiments, the temperature-dependent characteristics of the magnetostrictive material used in the distributed MMF sensor 114 may be characterized for calibrating the magnetomotive force measurements. In practice, the temperature or temperature gradient across the interrogating intervals of the magnetomotive force sensor system may be measured and remotely interrogated for a distributed temperature sensing (DTS) system.

In some embodiments, the magnetomotive force measurements may be corrected for vibrations effects using a distributed acoustic sensing (DAS) system. The cancellation of acoustic and vibration noise may be achieved through the length of fiber-optic cable 106 that is not part of the distributed MMF sensor 114, such as length KL shown herein, as long as the DAS is deployed in close proximity to the MMF sensor 114.

As disclosed herein, the embodiments of the distributed MMF sensor 114 system have no downhole power consumption. This is critical for deployment in offshore wells where the available power from subsea power modules is limited.

The distributed MMF sensor 114 system may be fabricated with mass production techniques and for ease of deployment. For example, for permanent reservoir monitoring, the transmitter and sensor systems may be pre-fabricated in a factory and delivered on a cable drum for ease of deployment at the well site by being clamped to the side of the casing, e.g., per standard practice for DAS and DTS. So the side of the casing could have one or more of DAS, DTS, and MMF systems attached. As another example, for temporary reservoir monitoring, the transmitter and sensor systems may be pre-fabricated in a factory and delivered on a cable drum for ease of wireline deployment at the well site, e.g., per standard practice for wireline DAS for VSP acquisition. Thus, the cable drum could have one or more of DAS and MMF systems included.

In some embodiments, the azimuthal position of the distributed MMF sensor 114 is measured by excitation from a magnetic source, and concurrently measuring the acoustic signal with an acoustic sensor. For example, when the distributed MMF sensor 114 is deployed behind casing, a wireline tool may traverse the borehole of the well, generating magnetic fields with an induction transmitter. The induced strain generates an acoustic signal sensed with an acoustic transducer on the wireline tool. Directionality is attained by having multiple acoustic transducers azimuthally about the wireline tool body. This is particularly relevant for locating the position of the fiber-optic cable 106 prior to perforating.

Figure 5A:
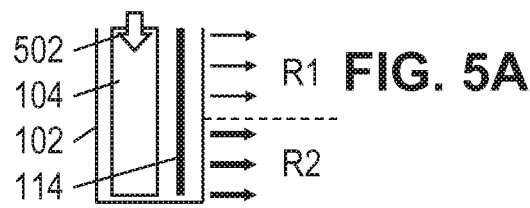
FIGS. 5A-5E show various illustrative injected-current system configurations.

FIG. 5A is a schematic representation of the system configuration in FIG. 1A or 1B. It shows a borehole 102 having a casing 104 and a fiber-optic cable 106 (with an integrated sensor 114) in the annular space. An injected current 502 flows along casing 104 and disperses into the surrounding formations as indicated by the arrows. Two formations are shown, labeled with their respective resistivities R1 and R2. The heavier arrows in the lower formation represent a larger current flow, indicating that resistivity R2 is lower than resistivity R1. Due to divergence pattern of the currents away from the casing, depth of investigation is typically around 5-15 feet (1.5-4.6 m).

Figure 5B:
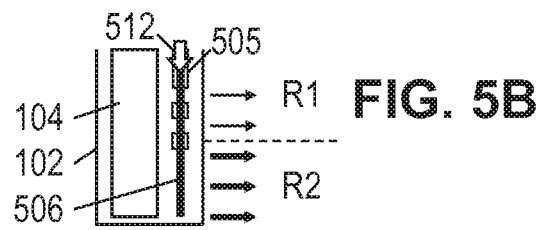

FIG. 5B shows an alternative system configuration, in which the fiber-optic cable 106 is replaced by an alternative fiber-optic cable 506 having a conductor or a conductive layer to transport an injected current 512 along the cable. The conductor may be a protective metal tube within which the fiber-optic cable is placed. Alternatively, the conductor may be a wire (e.g., a strength member) embedded in the fiber-optic cable. As another alternative, a metal coating may be manufactured on the cable to serve as the current carrier. Parts of the cable may be covered with an insulator 505 to focus the current dispersal in areas of interest. The optical fiber in cable 512 may act as the distributed MMF sensor 114. Because conductive layers can significantly attenuate certain types of electromagnetic fields, the sensor is designed to be operable despite the presence of the conductive layer, e.g., magnetic field sensors, and/or apertures are formed in the conductive layer to permit the magnetic fields to reach the sensor 114.

Figure 5C:
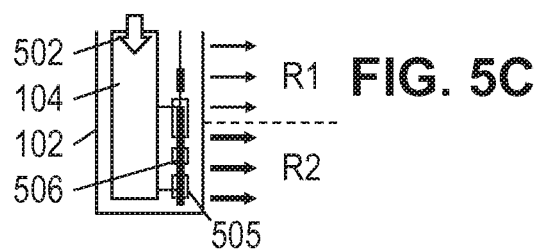

FIG. 5C shows another alternative system configuration. A conductor or conductive layer of fiber-optic cable 506 is electrically coupled to casing 104 to share the same electrical potential and contribute to the dispersal of current into the formation. Parts of the cable 506 and/or casing 104 may be covered with an insulator 505 to focus the current dispersal in areas of interest.

Figure 5D:
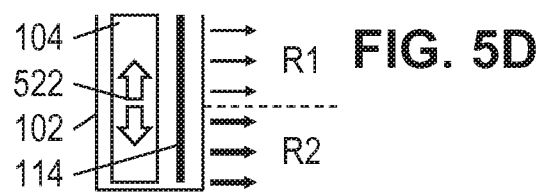

FIG. 5D shows yet another alternative system configuration. Rather than providing an injected current 502 from the surface as in FIG. 5A, the configuration of FIG. 5D provides an injected current 522 from an intermediate point along the casing 104. Such a current may be generated with an insulated electrical cable passing through the interior of casing 104 from a power source 120 (FIG. 1A or 1B) to a tool that makes electrical contact at the intermediate point, e.g., via extendible arms. (An alternative approach employs a toroid around casing 104 at the intermediate point to induce current flow along the casing. The toroid provides an electric dipole radiation pattern rather than the illustrated monopole radiation pattern.)

Figure 5E:
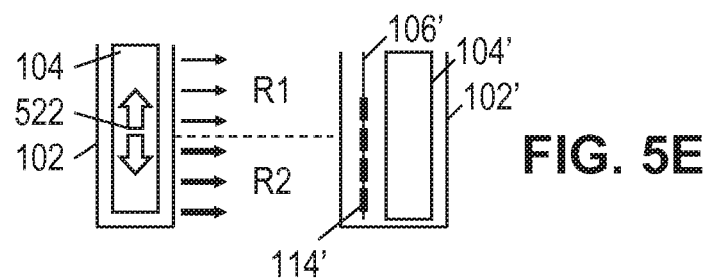

FIG. 5E shows still another alternative system configuration having a first borehole 102 and second borehole 102'. Casing 104 in the first borehole 102 carries an injected current from the surface or an intermediate point and disperses it into the surrounding formations. The second borehole 102' has a casing 104' for producing hydrocarbons and further includes a fiber-optic cable 106' with a distributed MMF sensor 114' in the annular space around casing 104'. The MMF sensors 114 and 114' provide measurements of the fields resulting from the currents dispersed in the formations.

The sensor array may employ multiple fiber-optic cables 106 as indicated in FIG. 6A. With cables 106 positioned in parallel or at least in an overlapping axial range, the azimuthal arrangement of sensors 114 enables a multi-dimensional mapping of the magnetic fields. In some embodiments, the sensors are mounted to the casing 104 or suspended on fins or spacers to space them away from the body of casing 104. If actual contact with the formation is desired, the sensors 114 may be mounted on swellable packers 602 as indicated in FIG. 6B. Such packers 602 expand when exposed to downhole conditions, pressing the sensors 114 into contact with the borehole wall.

FIG. 6C shows the use of bow-spring centralizers 604 which also operate to press the sensors 114 into contact with the borehole walls. To minimize insertion difficulties, a restraining mechanism may hold the spring arms 604 against the casing 104 until the casing has been inserted in the borehole. Thereafter, exposure to downhole conditions or a circulated fluid (e.g., an acid) degrades the restraining mechanism and enables the spring arms to extend the sensors against the borehole wall. If made of conductive material, the spring arms may further serve as current injection electrodes, concentrating the measurable fields in the vicinity of the sensors. To further concentrate the fields, the spring arms outside the zone of interest may be insulated.

Other extension mechanisms are known in the oilfield and may be suitable for placing the sensors 114 in contact with the borehole wall or into some other desired arrangements such as those illustrated in FIGS. 6D and 6E. In FIG. 6D, the sensors 114 are positioned near the radial midpoint of the annular region. In FIG. 6E, the sensors 114 are placed in a spatial distribution having axial, azimuthal, and radial variation. Balloons, hydraulic arms, and protuberances are other contemplated mechanisms for positioning the sensors.

FIG. 7 shows an illustrative fixed positioning mechanism for sensors 114. The cage 702 includes two clamps 703A, 703B joined by six ribs 704. The fiber-optic cable(s) 106 can be run along the ribs or, as shown in FIG. 7, they can be wound helically around the cage. In either case, the ribs provide each fiber-optic cable 106 some radial spacing from the casing 104. Cable ties 706 can be used to hold the cable in place until cementing has been completed. The ribs can be made of insulating material to avoid distortion of the electromagnetic fields around the sensors.

In addition to providing support and communications for sensors 114, the fiber-optic cable 106 may support electrodes or antennas for generating electromagnetic fields in the absence of current injection via casing 104. FIG. 8A shows two electrodes 802 on cable 106. A voltage is generated between the two electrodes 802 to create an electric dipole radiation pattern. The response of the MMF sensors 114 can then be used to derive formation parameters.

Similarly, FIG. 8B shows a solenoid antenna 804 on cable 106. A current is supplied to the solenoid coil to create a magnetic dipole radiation pattern. The response of the MMF sensors 114 can then be used to derive formation parameters. In both cases the sensors 114 are shown to one side of the source, but this is not a requirement. The source may be positioned between sensors 114 and/or one or more sections of the sensor 114 may be positioned between multiple sources. The sensor sections 114 may even be positioned between the electrodes of a electric dipole source. Moreover, it is possible to tilt the sources and/or the sensors to provide improved directional sensitivity.

FIG. 9 provides a function block representation of an illustrative fiber-optic-based permanent monitoring system. The sensors 114 convert a property of the surrounding magnetic fields into a signal that can be sensed via an optical fiber. (Specific examples are provided further below.) An energy source 906 may be provided in the form of a pair of conductors conveying power from the surface or in the form of a powerful downhole battery that contains enough energy to make the device operate for the full life span. It is possible to use an energy saving scheme to turn on or off the device periodically. It is also possible to adjust the power level based on inputs from the fiber optic cable 106, or based on the sensor 114 inputs.

A controller 904 provides power to the transducers 902 and controls the data acquisition and communication operations and may contain a microprocessor and a random access memory. Transmission and reception can be time activated, or may be based on a signal provided through the fiber-optic cable 106 or the casing. After the controller 904 obtains the signal data, it communicates the signal to the fiber-optic interface 908. The interface 908 is an element that produces new optical signals in fiber-optic cable 910 or modifies existing optical signals in the cable 910. For example, optical signal generation can be achieved by the use of LEDs, lasers, or any other type of optical source. As another example, optical signals that are generated at the surface can be modified by induced thermal or induced strain effects on the optical fiber in cable 610. Induced thermal effects can be produced by a heat source or sink, whereas induced strain effects can be achieved by a piezoelectric device or a downhole electrical motor.

The fiber-optic interface 908 may generate modification via extrinsic effects (i.e., outside the fiber) or intrinsic effects (i.e., inside the fiber). An example of the former technique is a Fabry Perot sensor, while an example of the latter technique is a Fiber Bragg Grating. For optimum communication performance, the signal in the optical transmission phase may be modulated, converted to digital form, or digitally encoded. The cable is coupled to a receiver or transceiver 912 that converts the received light signals into digital data. Stacking of sequential measurements may be used to improve signal to noise ratio. The system can be based on either narrowband (frequency type) sensing or ultra wideband (transient pulse) sensing. Narrowband sensing often enables the use of reduced-complexity receivers, whereas wideband sensing may provide more information due to the presence of a wider frequency band.

In an alternative embodiment, where the fiber-optic cable 106 forms the loop from J to K to L, no fiber-optic interface 908 is needed, as Sagnac interferometry may be used to sense the magnetostriction effects from the MMF sensor 114 on the fiber-optic cable 106.

Optionally, a power source 914 transmits power via an electrical conductor 916 to a downhole source controller 918. The source controller 918 operates a magnetic field source 920. Multiple such sources may be provided and operated in sequence or in parallel at such times and frequencies as may be determined by controller 918.

Sensor 114 may be positioned along a given optical fiber as a series of non-contiguous sections. In FIG. 10, a light source 1002 emits light in a continuous beam. Alternatively, the light source 1002 may emit light in pulses. A circulator 1004 directs the light along fiber-optic cable 106. The light travels along the cable 106, interacting with the sensor 114, shown in a plurality of non-contiguous sections, before reflecting off the end of the cable and returning to circulator 1004. The circulator directs the reflected light to a light detector 1008.

The arrangement of FIG. 10 is a reflective arrangement in which the light reflects from a fiber termination point, such as the reflector shown in FIG. 1A. The figure may be converted to a transmissive arrangement in which the termination point is replaced by a return fiber that communicates the light back to the surface, such as is shown in FIG. 1B.

Thus each production well may be equipped with a permanent sensor 114 distributed along axial, azimuthal and radial directions outside the casing. The sensor 114 may be positioned inside the cement or at the boundary between cement and the formation. Each sensor 114 section is on a fiber-optic cable 106 that serves as the communication link with the surface. The sensor 114 is entirely passive. Sensor positioning can be optimized based on geology or made randomly. In any configuration, the sensor positions can often be precisely located by monitoring the light signal travel times in the fiber, using induced effects at the sensor section location.

Cement composition may be designed to enhance the sensing capability of the system. For example, configurations employing the casing as a current source electrode can employ a cement having a resistivity equal to or smaller than the formation resistivity.

The sensor 114 referenced above preferably employ fully optical means to measure magnetic fields and possibly magnetic field gradients and transfer the measurement information through optical fibers to the surface for processing to extract the measurement information.

An interrogation light pulse is sent from the surface through the fiber and, when the pulse reaches the MMF sensor 114, it passes through the sensor and the light is modified by the sensor in accordance with the magnetic field interaction characteristic of magnetostriction. The modified light travels through the fiber to a processing unit located at the surface. In the processing unit the light modification change is extracted.

Figure 11:
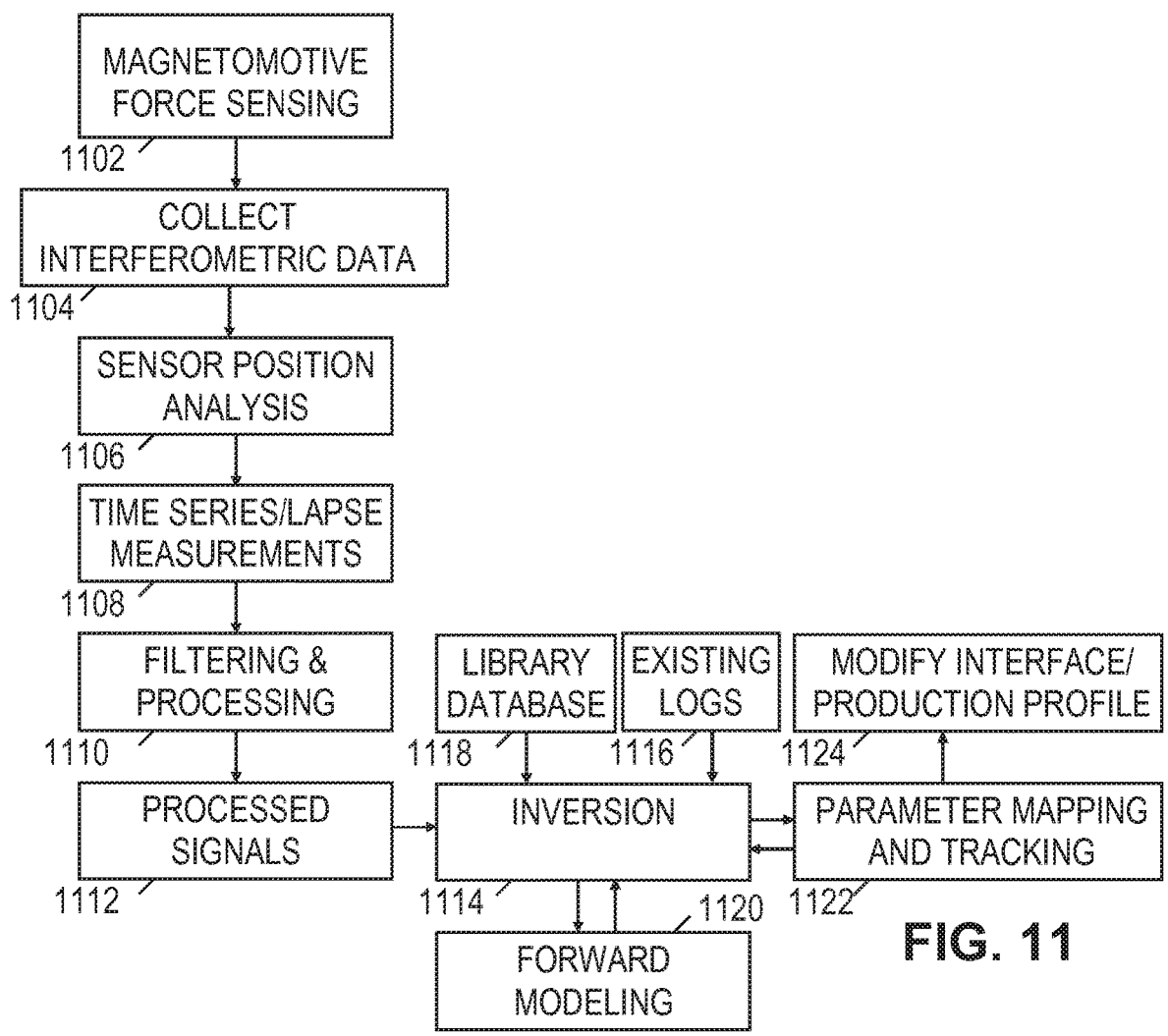
FIG. 11 is a signal flow diagram for an illustrative formation monitoring method.

FIG. 11 provides an overview of illustrative formation monitoring methods. A controlled electromagnetic field source generates a subsurface magnetic field. While it is possible for this field to be a fixed (DC) field, it is expected that better measurements will be achievable with an alternating current (AC) field having a frequency in the range of 1-1000 Hz. (In applications where shallow detection is desired, higher frequencies such as 1 kHz to 1 GHz can be used.) In block 1102, each section of the sensor 114 converts the magnetic field into a selected characteristic, either strain from magnetostriction or optical interference in the optical fiber core induced from the strain. Either water-flood movements and fracturing are examples of monitoring situations.

In block 1104, the voltage (or electric field or magnetic field or electric/magnetic field gradient) is applied to modify some characteristic of light passing through an optical fiber, e.g., travel time, frequency, phase, amplitude. In block 1106, the surface receiver extracts the represented measurements and associates them with a sensor section, which may be the entire length. The measurements are repeated and collected as a function of time in block 1108. In addition, measurements at different times can be subtracted from each other to obtain time-lapse measurements. Multiple time-lapse measurements with different lapse durations can be made to achieve different time resolutions for time-lapse measurements. In block 1110, a data processing system filters and processes the measurements to calibrate them and improve signal to noise ratio. Suitable operations include filtering in time to reduce noise; averaging multiple sensor data runs to reduce noise; taking the difference or the ratio of multiple values to remove unwanted effects such as a common voltage drift due to temperature; other temperature correction schemes such as a temperature correction table; calibration to known/expected resistivity values from an existing well log; and array processing (software focusing) of the data to achieve different depth of detection or vertical resolution.

In block 1112, the processed signals are stored for use as inputs to an inversion process in block 1114. Other inputs to the inversion process are existing logs (block 1116) such as formation resistivity logs, porosity logs, etc., or a library/database of pre-calculated predicted signals 1118 or a forward model 1120 of the system that generates predicted signals in response to model parameters, e.g., a two- or three-dimensional distribution of resistivity. All resistivity, electric permittivity (dielectric constant), relaxation, or magnetic permeability properties of the formation can be measured and modeled as a function of time and frequency. The parameterized model can involve isotropic or anisotropic electrical (resistivity, dielectric, relaxation, permeability) properties. They can also include layered formation models where each layer is homogeneous in resistivity. Resistivity variations in one or more dimensions can be included. The inversion process searches a model parameter space to find the best match between measured signals 1112 and generated signals. In block 1122 the parameters are stored and used as a starting point for iterations at subsequent iterations.

Effects due to presence of tubing, casing, mud and cement can be corrected by using a-priori information on these parameters, or by solving for some or all of them during the inversion process. Since all of these effects are mainly additive and they remain the same in time, a time-lapse measurement can remove them. Multiplicative (scaling) portion of the effects can be removed in the process of calibration to an existing log. All additive, multiplicative and any other non-linear effect can be solved for by including them in the inversion process as parameters.

The fluid front position can be derived from the parameters and it is used as the basis for modifying the flood and/or production profile in block 1124. Production from a well is a dynamic process and each production zone's characteristics may change over time. For example, in the case of water flood injection from a second well, water front may reach some of the perforations and replace the existing oil production. Since flow of water in formations is not very predictable, stopping the flow before such a breakthrough event requires frequent monitoring of the formations.

Profile parameters such as flow rate/pressure in selected production zones, flow rate/pressure in selected injection zones, and the composition of the injection fluid, can each be varied. For example, injection from a secondary well can be stopped or slowed down when an approaching water flood is detected near the production well. In the production well, production from a set of perforations that produce water or that are predicted to produce water in relatively short time can be stopped or slowed down.

We note here that the time lapse signal derived from the signals is expected to be proportional to the contrast between formation parameters. Hence, it is possible to enhance the signal created by an approaching flood front by enhancing the electromagnetic contrast of the flood fluid relative to the connate fluid. For example, a high magnetic permeability, or electrical permittivity, chargeable, or conductivity fluid can be used in the injection process in the place of or in conjunction with water. It is also possible to achieve a similar effect by injecting a contrast fluid from the wellbore in which monitoring is taking place, but this time changing the initial condition of the formation.

Once a drill string has been removed from the borehole, a wireline tool string can be lowered into the borehole by a cable. In some embodiments, the cable includes conductors for transporting power to the tools and telemetry from the tools to the surface. It should be noted that various types of formation property sensors can be included with the wireline tool string, including the MMF sensor 114. An illustrative wireline tool string includes logging sonde with at least the distributed MMF sensor 114.

The wireline logging facility collects measurements from the MMF sensor 114 and/or or other instruments in the logging sonde. In some embodiments, the wireline logging facility includes computing facilities for managing logging operations, for acquiring and storing measurements gathered by the logging sonde and/or MMF sensor 114, for inverting measurements determine formation properties, and for displaying the measurements or formation properties to an operator. The tool string may be lowered into an open section of the borehole or a cased section of the borehole. In a cased borehole environment, the casing may produce attenuation to signals that are received by the MMF sensor 114. However, the disclosed techniques can still be performed in a cased borehole environment, especially at low frequencies where attenuation due to casing is low.

The disclosed systems and methods may offer a number of advantages. They may enable continuous time-lapse monitoring of formations including a water flood. They may further enable optimization of hydrocarbon production by enabling the operator to track flows associated with each perforation and selectively block water influxes. Precise localization of the sensor 114 is not required during placement since that information can be derived afterwards via the fiber-optic cable 106. Casing source embodiments do not require separate downhole sources, significantly decreasing the system cost and increasing reliability.

As disclosed herein, an EM source, such as a magnetic source may include a metallic tube used as the source for the current into the formation. In another embodiment, the coating on the optical fiber is the EM source for current to be injected into the formation. In yet another embodiment, the EM source is a permanent EM device that is permanently placed on or outside the casing. A coil or a solenoid antenna may be used as a magnetic dipole source.

Numerous other variations and modifications will become apparent to those skilled in the art once the above disclosure is fully appreciated. For example, this sensing system can be used for cross well tomography with transmitters are placed in one well and magnetic fields being measured in surrounding wells which can be drilled at an optimized distance with respect to each other and cover the volume of the reservoir from multiple sides for optimal imaging. It is intended that the following claims be interpreted to embrace all such variations and modifications where applicable.

In at least one embodiment, a formation monitoring system comprises an electromagnetic source and a casing that defines an annular space within a borehole. A length of a distributed magnetomotive force sensor is located in the annular space, and a fiber-optic cable conveys optical signals to and from the length of the distributed magnetomotive force sensor. A computer coupled to the fiber-optic cable receives optical signals from the length of the distributed magnetomotive force sensor, wherein the computer operates on the received optical signals to calculate at least one parameter associated with a fluid interface.

In at least one other embodiment, a formation monitoring system comprises an electromagnetic source, a length of a distributed magnetomotive force sensor locatable into a borehole, and a fiber-optic cable that conveys optical signals to and from the length of the distributed magnetomotive force sensor. A computer is operatively connectable to the fiber-optic cable to receive optical signals from the length of the distributed magnetomotive force sensor, wherein the computer operates on the received optical signals to calculate at least one parameter associated with a fluid interface.

In another embodiment, A formation monitoring method comprises injecting a first fluid into a reservoir formation and producing a second fluid from the reservoir formation via a casing in a borehole. The method further comprises generating a magnetic field in the earth with an electromagnetic source and collecting magnetic field measurements with a distributed magnetomotive force sensor in an annular space between the casing and the borehole. The distributed magnetomotive force sensor communicates measurements to a surface interface via one or more fiber-optic cables. The method further comprises operating on the measurements to locate the fluid interface between the first and second fluids.

The following features may be incorporated independently or collectively in any viable combination into either of the above embodiments. The distributed magnetomotive force sensor comprises a length of fiber-optic cable including a magnetostrictive material. The magnetostrictive material is nickel, or a nickel alloy, or Terfenol-D, or Metglass, or a polymer matrix including nickel or a nickel alloy or Terfendol-D or Metglass. The length of the fiber-optic cable including the magnetostrictive material is paired with a substantially same length of the fiber-optic cable that conveys the optical signals. The parameter associated with the fluid interface may comprise a fluid interface location. The fluid interface location maybe a fluid front in a flooding application. The fluid front ma be comprised of water or carbon dioxide. The computer may measure the parameter associated with the fluid interface at different time intervals. The electromagnetic source may comprise a power source coupled to the casing to generate a distribution of current flow into formations penetrated by the borehole. The source may be electrically connected to the casing above ground. The power source may be electrically connected to a casing in a second borehole. The power source may be electrically connected to a tool suspended on a cable, control line, tubing, or coiled tubing in a second borehole for cross-well monitoring. The length of the distributed magnetomotive force sensor may be positioned in a spiral in the annular space. The fiber-optic cable may include one or more electrical conductors coupled to a power source to generate a distribution of current into formations penetrated by the borehole. The electrical conductors may be uninsulated near regions of interest and insulated in other regions to direct current in the regions of interest. A second fiber-optic cable may be coupled to electromagnetic field sensors in the annular space that are in an axial range overlapping with an axial range of the array of electromagnetic sensors coupled to the optical waveguide. At least one magnetic dipole source antenna may be positioned in the annular space. The magnetic dipole source antenna may further comprises a multi-turn induction coil with a soft magnetic core. The computer may derive a multidimensional model of formation resistivity or conductivity based at least in part on the received optical signals to track a flood front location as a function of time. Collecting and operating to track the fluid interface as a function of time may be repeated. Reducing second fluid production from one or more zones upon detecting the fluid interface near the borehole. Reducing first fluid injection into one or more zones upon detecting the fluid interface near the borehole. An electromagnetic source may inject electrical current into the reservoir formation via the casing. The electromagnetic source may generate an electromagnetic field via a magnetic dipole source.

The following features may be incorporated independently or collectively in any viable combination into any of the above embodiments. The MMF sensors may be integrated into the fiber optic cable or on the surface of the cable. On the surface may include cladding or a separate layer attached to the surface of the cable. The fiber optic cable with the MMF sensors may be a segment ending in a reflector or a loop of fiber optic cable. The MMF sensors may be distributed across two or more (multiple) fiber optic cables, each with a source and detector or coupled to a switch to allow access to one source and/or one detector. The source may provide pulses or CW output. The surface interface (optical interface and/or optical receiver) may be part of the computer or in communication with the computer. The computer may be a data acquisition system, a data analysis system, or both. The computer may comprise a Sagnac interferometer or a fiber-optic interface such as a Fabry Perot sensor or a Fiber Bragg Grating. Sensing may be wide-band or narrow-band. Only part or parts of the length JK may include the MMF sensor. There may be full or partial cuts on the magnetostrictive material to release strain during deployment. The MMF system may be co-deployed with a DAS system, a DTS system, a temperature-sensing, a strain-sensing, and/or an acoustic-sensing system. Any current injection configuration may be used with any hardware configuration.

What is claimed is:

1. A formation monitoring system that comprises:
   an electromagnetic source that disperses current into the formation that surrounds a borehole;
   a casing that defines an annular space within the borehole;
   a fiber-optic cable including a length of a distributed magnetomotive force sensor positioned along at least a portion of the fiber-optic cable, wherein:
      the fiber-optic cable conveys optical signals to and from the length of the distributed magnetomotive force sensor;
      the length of the distributed magnetomotive force sensor is located in the annular space;
      the length of the distributed magnetomotive force sensor measures magnetic fields representative of a resistivity profile of formations surrounding the borehole;
      the magnetic fields are in response to the current generated by the electromagnetic source; and
      the resistivity profile is indicative of fluids in pores of the formations surrounding the borehole, enabling a fluid interface to be located; and
   a computer coupled to the fiber-optic cable to receive optical signals from the length of the distributed magnetomotive force sensor, wherein the computer operates on the received optical signals to calculate at least one parameter associated with the fluid interface.

2. The system of claim 1, wherein the distributed magnetomotive force sensor comprises a length of fiber-optic cable including a magnetostrictive material.

3. The system of claim 2, wherein the magnetostrictive material is nickel, a nickel alloy, or a polymer matrix including nickel or a nickel alloy.

4. The system of claim 2, wherein the length of the fiber-optic cable including the magnetostrictive material is paired with a substantially same length of the fiber-optic cable that conveys the optical signals.

5. The system of claim 1, wherein the at least one parameter comprises a fluid interface location.

6. The system of claim 5, wherein the fluid interface location is a fluid front comprised of water or carbon in a flooding application.

7. The system of claim 1, wherein the computer measures the at least one parameter at different time intervals.

8. The system of claim 1, wherein the electromagnetic source comprises a power source coupled to the casing to generate a distribution of current flow into formations penetrated by said borehole.

9. The system of claim 8, wherein the power source is electrically connected to said casing above ground or a casing in a second borehole.

10. The system of claim 8, wherein the power source is electrically connected to a tool suspended on a cable, control line, tubing, or coiled tubing in a second borehole for cross-well monitoring.

11. The system of claim 1, wherein the length of the distributed magnetomotive force sensor is positioned in a spiral in the annular space.

12. The system of claim 1, wherein the fiber-optic cable includes one or more electrical conductors coupled to a power source to generate a distribution of current into formations penetrated by said borehole.

13. The system of claim 12, wherein the one or more electrical conductors are uninsulated near regions of interest and insulated in other regions to direct current in said regions of interest.

14. The system of claim 1, further comprising at least one magnetic dipole source antenna positioned in the annular space.

15. The system of claim 14, wherein the at least one magnetic dipole source antenna further comprises a multi-turn induction coil with a soft magnetic core.

16. A formation monitoring method that comprises:
   injecting a first fluid into a reservoir formation;
   producing a second fluid from the reservoir formation via a casing in a borehole;
   generating a magnetic field in the earth by current dispersed by an electromagnetic source;
   collecting magnetic field measurements in response to the current dispersed in the earth generated by the electromagnetic source with a length of a distributed magnetomotive force sensor included in and positioned along at least of portion of a fiber-optic cable, wherein:
      the fiber-optic cable conveys optical signals to and from the length of the distributed magnetomotive force sensor;
      the length of the distributed magnetomotive force sensor is located in an annular space between the casing and the borehole;

the magnetic fields are representative of a resistivity profile of a portion of the reservoir formation that surrounds the borehole; and the resistivity profile is indicative of fluids in pores of the portions of the reservoir formation that surrounds the borehole; and locating a fluid interface between the first and second fluids using the resistivity profile.

17. The method of claim 16, further comprising repeating said collecting and operating to track the fluid interface as a function of time.

18. The method of claim 16, further comprising reducing second fluid production from one or more zones upon detecting said fluid interface near said borehole.

19. A formation monitoring system that comprises:

an electromagnetic source that disperses a current into the formation that surrounds a borehole;

a fiber-optic cable including a length of a distributed magnetomotive force sensor positioned along at least a portion of the fiber-optic cable, wherein:

the fiber-optic cable conveys optical signals to and from the length of the distributed magnetomotive force sensor;

the length of the distributed magnetomotive force sensor is located in a borehole;

the length of the distributed magnetomotive force sensor measures magnetic fields representative of a resistivity profile of formations surrounding the borehole;

the magnetic fields are in response to the current generated by the electromagnetic source; and the resistivity profile is indicative of fluids in pores of the formations surrounding the borehole, enabling a fluid interface to be located; and a computer operatively connectable to the fiber-optic cable to receive optical signals from the length of the distributed magnetomotive force sensor, wherein the computer operates on the received optical signals to calculate at least one parameter associated with the fluid interface.

* * * * *